United States Patent [19]

Sikes et al.

[11] Patent Number: 5,908,885
[45] Date of Patent: Jun. 1, 1999

[54] POLYSUCCINIMIDE AND POLYASPARTATE AS ADDITIVES TO CEMENTITIOUS MATERIALS

[75] Inventors: C. Steven Sikes, Mobile, Ala.; Thomas M. Vickers, Jr., Concord Township; Stephen A. Farrington, Chardon, both of Ohio

[73] Assignees: University of South Alabama, Mobile, Ala.; MBT Holding AG, Zurich, Switzerland

[21] Appl. No.: 08/886,475

[22] Filed: Jul. 1, 1997

[51] Int. Cl.[6] .............................. C08K 3/00; C08L 33/24; C04B 7/00
[52] U.S. Cl. ...................................... 524/5; 524/4
[58] Field of Search ............................... 524/4, 5

[56] References Cited

U.S. PATENT DOCUMENTS

| | | | |
|---|---|---|---|
| 3,943,083 | 3/1976 | Adams et al. | 524/5 |
| 4,866,161 | 9/1989 | Sikes et al. | 530/324 |
| 4,868,287 | 9/1989 | Sikes et al. | 530/324 |
| 4,939,191 | 7/1990 | Kataoka et al. | 524/5 |
| 5,051,401 | 9/1991 | Sikes | 514/7 |
| 5,260,272 | 11/1993 | Donachy et al. | 514/12 |
| 5,284,936 | 2/1994 | Donachy et al. | 530/350 |
| 5,328,690 | 7/1994 | Sikes | 424/401 |
| 5,432,212 | 7/1995 | Honda et al. | 524/5 |
| 5,684,082 | 11/1997 | Segatta | 524/525 |

*Primary Examiner*—Peter A. Szekely
*Attorney, Agent, or Firm*—Oblon, Spivak, McClelland, Maier & Neustadt, P.C.

[57] ABSTRACT

Polysuccinimide and/or polyaspartate, copolymers of succinimide and aspartate and the polymers cross-linked with a diamine are demonstrated to be enhancement agents for the preparation of cementitious materials. The agents may be added to the dry cementitious mixture or the water which is added to form the cementitious material upon hardening. The enhancement agents improve the workability of the wet cementitious mixture, reduce slump loss during mixing, transport, and placement of the wet cementious mixture; and may provide extra strength upon hardening of the cementitious material.

11 Claims, No Drawings

POLYSUCCINIMIDE AND POLYASPARTATE AS ADDITIVES TO CEMENTITIOUS MATERIALS

BACKGROUND OF THE INVENTION

1. Field of the Invention

The present invention relates to the use of polysuccinimide as an additive to cementitious materials that improves flowability during mixing and leads to improved strength on curing. In addition, polyaspartate alone, polyaspartate in combination with polysuccinimide, or a copolymer of aspartate and succinimide residues also are useful in cement for improved flowability over time and development of strength.

2. Discussion of the Background

Polysuccinimide is made commercially by thermal polymerization of maleic anhydride and ammonia and related precursor monomeric reactants that upon heating produce aspartic acid which then condenses to yield the polyimide. (U.S. Pat. No. 3,846,380 to Fujimoto and Teranishi, 1974; U.S. Pat. No. 4,839,461 to Boehmke, 1989; U.S. Pat. No. 5,219,952 to Koskan and Meah, 1993; and U.S. Pat. No. 5,371,180 to Groth et al., 1994).

In addition, thermal polymerization of aspartic acid itself produces polysuccinimide. This is accomplished by use of the dry powder of aspartic acid alone (Schiff, 1898; U.S. Pat. No. 5,051,401 to Sikes, 1991; U.S. Pat. No. 5,152,902 to Koskan et al., 1992) or in the presence of an acidic catalyst/solvent such as phosphoric acid (U.S. Pat. No. 3,052,655 to Fox and Harada, 1962; U.S. Pat. No. 4,363,797 to Jacquet et al., 1982; U.S. Pat. No. 5,329,020 to Kalota and Martin, 1994; U.S. Pat. No. 5,393,868 to Freeman et al., 1995; and U.S. Pat. No. 5,536,813 to Charpenel and Lepage, 1996).

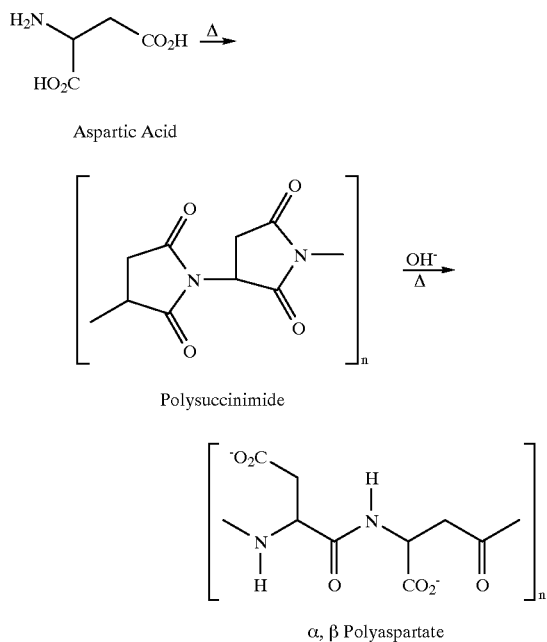

Typically, the synthesis of polyaspartic acid does involve polysuccinimide as an intermediate, which is then subjected to mild alkaline hydrolysis to produce polyaspartate, usually as the sodium salt. However, it also is possible to produce polyaspartate directly, without the intermediate polysuccinimide, by thermal polymerization of alkali salts of aspartate, such as monosodium aspartate (U.S. patent application Ser. No. 08/842,016 by Sikes and Japanese Kokai 08-169741. This publication is not prior art with respect to the invention disclosed and claimed herein). Similarly, sodium maleamic acid has been used to produce polyaspartate directly (U.S. Pat. No. 5,548,036 to Kroner et al., 1996). IL addition, mixtures of maleic acid, urea, and sodium carbonate were treated thermally to produce polyaspartate directly (U.S. Pat. No. 5,371,180 to Groth et al., 1996).

It is further possible to produce a mixed amide/imide copolymer of aspartic acid and succinimide either by use of temperatures that are too low to drive the reaction to completion (e.g., <140° C., U.S. Pat. No. 4,839,461 to Boehmke, 1989; U.S. Pat. No. 5,219,952 to Koskan and Meah, 1993) or by use of reaction times that are too short (e.g., <10 minutes at 180° C., U.S. Pat. No. 5,493,004 to Groth et al., 1996). Finally, it is possible to produce a mixed amide/imide copolymer of aspartate and succinimide by thermal polymerization even at elevated temperature for extended reaction times by use of a reaction mixture of an alkali salt of aspartate such as monosodium aspartate and aspartic acid (U.S. patent application Ser. No. 08/842,016 by Sikes).

The hydrolysis of polysuccinimide to open the imide rings and produce polyaspartate is rate-dependent on the particle size of the polysuccinimide and proceeds over periods of minutes to hours at pH around 10 and temperatures around 80° C. (Mosig, 1992; Mosig et al., 1997; Low et al., 1996). The hydrolysis may take more than 24 hours at pH 10, 25° C. (U.S. patent application Ser. No. 08/596,439 by Sikes). Early kinetic analysis of the hydrolysis was interpreted to show that the reaction slowed as the ring-opening proceeded due to repulsion of polyanionic regions of polyaspartate with hydroxide ion (Hoagland and Fox, 1973), perhaps resulting in a mixed polymer of succinimide and aspartate residues. However, NMR (nuclear magnetic resonance) spectra of reaction products later suggested that the ring-opening of individual polymer molecules proceeded rapidly to completion once begun such that there was only a set of completely ring-opened polyaspartate molecules along with a residual set of core, insoluble polysuccinimide particles that had yet to react with the alkaline, aqueous phase (Wolk et al., 1994). Whereas the polysuccinimide particles are hydrophobic and highly insoluble in water, the polyaspartate molecules are highly hydrophilic and will form aqueous solutions of up to 40% by weight.

The conversion of polysuccinimide to polyaspartate in mild, alkaline, aqueous solution in effect is a controlled release of soluble, polyanionic polymer from an insoluble hydrophobic particle. This is a useful reaction to occur within the environment of forming cementitious materials, which becomes alkaline as the cementitious mineral phases react with the mixing water to form the hydration products of set cement, which include $Ca(OH)_2$. The presence of both hydrophobic and polyanionic polymers in controlled amounts are known in the art to improve the properties of cementitious materials both during the forming stages and in the finished products.

For example, polymers that have both hydrophobic and hydrophilic character are useful in cement for dispersing the mineral particles during mixing, improving the flowability of the mix, and allowing reduction in the amount of water required to form the mix. At the same time, properties such as setting time, adhesion, and strength of the formed cementitious materials remained favorable or were improved (U.S. Pat. No. 5,290,869 to Kinoshita et al., 1994; U.S. Pat. No.

5,362,324 to Cerulli et al., 1994; U.S. Pat. No 5,432,212 to Honda et al., 1995; U.S. Pat. No. 5,466,289 to Yonezawa et al., 1995; and U.S. Pat. No. 5.494,516 and U.S. Pat. No. 5,609,681 to Josef et al., 1994, 1996). Monomeric constituents of the polymers of these references include, for example, alkylene oxide, napthalene sulfonate-formaldehyde, styrene, ethylene glycol, propylene glycol, maleic anhydride, and methacrylate. Polysuccinimide itself has been reported to improve the flowability of Portland cement powder when mixed with water (Japanese Kokai 008-169741 to Harada et al.; this publication is not prior art with respect to the invention disclosed and claimed herein).

Thus, it would be useful if a single homopolymer could provide the improved flowability of a cement mixture provided by an hydrophobized polymer additive as well as the improved binding characteristics provided by polyanionic polymers within the cement mixture. It is here reported that polysuccinimide may be added to cementitious materials for the purposes of improving flowability during mixing, decreasing slump loss during transport and placement, and strengthening the formed product. The phrase, "cementitious materials", is meant to include: cement, a mixture of cement powder and water; mortar, a mixture of cement powder, fine aggregates, and water; and concrete, a mixture of cement powder, fine aggregates, and coarse aggregates; as well as any other combination of cement powder and other materials such as silica fame, fly ash, slag, and lime powder.

In the aqueous environment of freshly mixed cementitious materials, polysuccinimide is converted to polyaspartate. This provides both hydrophobic and hydrophilic characteristics to the interactions of the polymer with the hydrating cement phases during the period of mixing and setting.

SUMMARY OF THE INVENTION

Accordingly, it is one object of the present invention to provide a novel use of polysuccinimide in cementitious materials.

It is another object of the present invention to provide a novel use of polyaspartate in cementitious materials.

It is another object of the present invention to provide a novel use of polysuccinimide and polyaspartate as co-additives in cementitious materials.

It is another object of the present invention to provide a novel use of copolymers of succinimide and aspartate in cementitious materials.

It is another object of the present invention to provide a novel use of higher molecular weight polysuccinimides that contain diamine crosslinks in cementitious materials.

These and other objects of the present invention, which will become apparent during the following detailed description, have been achieved by the inventors' discovery that polysuccinimide as a properly formulated additive to cementitious materials acts to improve flowability and reduce slump loss, does not adversely affect setting, and may lead to strengthening of the hardened products.

DETAILED DESCRIPTION OF THE INVENTION

Cement powder such as Portland type I cement, mortar, concrete and any other cementitious material may be formulated with polysuccinimide of any available molecular weight in the amounts of 0.025 to 5% by weight of the cement powder, exclusive of fine and coarse aggregates and other such materials that make up the final cementitious product. Preferably the poysuccinimide is present in the cement powder in the amount of 0.1 to 2% by weight, most preferably 0.2 to 1% by weight. Upon addition of water, the cement, mortar, or concrete remains more workable and easily mixed during the period of mixing and transport. Once placed, the cementitious materials harden normally to form strong products.

Cementitious material s may also be formulated with any available polyaspartate in the amounts of 0.025 to 5% by weight, preferably 0.05 to 2% by weight, most preferably 0.1 to 1% by weight of the cement powder. Alternatively, the polyaspartate may be added as a solution in the mixing water to provide the same total amounts of polyaspartate in the cementitious product as recited above when polyaspartate is formulated with the dry cement powder. Upon addition of the water, the cement, mortar, concrete, and other cementitious materials remain workable and easily mixed; and, once placed, the products have improved strength.

Cement powder for use in cementitious materials may also be formulated with a copolymer of succinimide and aspartate residues in the amounts as recited above for use of homopolymers of polysuccinimide or polyaspartate. Upon addition of water, the workability and ease of mixing of the cementitious materials are improved, along with improvements in the setting and hardening of the products.

Polysuccinimide molecules that are attached to each other via diamine crosslinks and have peak average molecular weights ranging above 50,000 to 10 million and higher, preferably 100,000 to 5 million, most preferably 200,000 to 1 million also may be used in cementitious materials in a manner similar to that of homopolymers of polysuccinimide. Upon ring-opening by mild alkaline hydrolysis, the diamine-linked polysuccinimides are converted to very high molecular weight forms of polyaspartate, also crosslinked via the diamines. The polyaspartates so produced are water soluble. Each of the polysuccinimide-diamine materials and polyaspartate-diamine materials may be formulated as recited above for polysuccinimides or polyaspartates alone, respectively.

Finally, the five types of molecules that are identified for use in cementitious materials in the invention: (1) polysuccinimide, (2) polyaspartate, (3) copolymers of succinimide and aspartate, (4) polysuccinimide that is crosslinked via a diamine compound, and (5) the polyaspartate form of the polysuccinimide that is crosslinked via a diamine compound; may be used as described in the invention in any combination with each other.

For example, polysuccinimide and polyaspartate may be used as coadditives to cementitious materials to provide the improved workability and reduced slump loss during mixing and transport that is attributable to hydrophobic additives such as polysuccinimide as well as the improved setting and hardening characteristics imparted by a polyanionic additive such as polyaspartate. The coadditives preferably are formulated in any combination of each such that the total amount of them is 0.025 to 5% by weight of the cement powder. More preferably, they are added as 0.05 to 2% by weight of each to the cement powder. Most preferably, they are added as 0.1 to 1% by weight of each to the cement powder.

In addition, any combination of any two, three, four, or all five of the additives may be formulated in cement, mortar, concrete, or any cementitious material to improve the properties of the materials during mixing, transport, and placement, as well as the strength of the hardened products. Preferably, the total amount of the additives is not more than 5% by weight of the cement powder. More preferably, the total amount of the additives is 0.1 to 2% by weight of the cement powder. Most preferably, the total amount of the additives is 0.2 to 1% by weight of the cement powder.

Other features of the invention will become apparent in the course of the following descriptions of exemplary embodiments which are given for illustration of the invention and are not intended to be limiting thereof.

EXAMPLES

Example 1
Preparation of low molecular weight (MW) polysuccinimide by dry, thermal polymerization of aspartic acid A sample of 100 g of aspartic acid (Sigma Chemical Company) in a 600 ml beaker was placed in an oven that was thermostated at 220° C.±1° C. (J-Kem temperature controller, model 250). After 8 hours of reaction, the sample was removed, allowed to cool, and placed in a sample bottle. The product was shown by infrared spectroscopy (Perkin Elmer, model 1600) to be polysuccinimide. The molecular weight was measured as 3600 daltons by gel permeation of the equivalent polyaspartate. In this and the other examples, polysuccinimide was converted to polyaspartate by mild, alkaline hydrolysis of the imide rings at pH 10, 80° C. for 1 hour. This polysuccinimide and its polyaspartate are thought to be moderately branched based on NMR (nuclear magnetic resonance) and IR (infrared) spectra of putative linkages at branch points.

Example 2
Preparation of low MW polysuccinimide by thermal polymerization of aspartic acid in phosphoric acid, $H_3PO_4$ A sample of 75 g of aspartic acid was placed in a 4-liter beaker. To this, 37.5 ml of $H_3PO_4$ (Fisher Scientific) were added and stirred manually to a homogeneous mixture. The beaker was placed in the oven, thermostated as above at 180° C. After 2 hours, the beaker was removed from the oven. The sample had risen to fill one-third of the beaker, forming a whitish, crusty foam. Two liters of distilled water were added to soften the product and allow it to be scraped from the sides of the beaker. The material was transferred to 6, 500-ml, polycarbonate centrifuge tubes and centrifuged at 5000 rpm for 10 minutes (Beckman J2-21 centrifuge, JA 10 rotor, operating at 4420 g's). The insoluble polysuccinimide formed a pellet and the supernatant was decanted, thus removing the $H_3PO_4$. This process was repeated until the supernatant was pH neutral. The product was lyophilized to a light, cream-colored product and confirmed as polysuccinimide by infrared spectroscopy. The product was free of phosphoric catalyst, as shown by spectrophotometric analysis for residual phosphate. The gel permeation, peak average MW of the product was 3468. This polysuccinimide and its polyaspartate are considered to be linear, unbranched molecules, based on the lack of NMR (nuclear magnetic resonance) and IR (infrared) signals for putative branch points.

Example 3
Preparation of medium MW polysuccinimide by thermal polymerization of aspartic acid in $H_3PO_4$ The procedures and reactions of example 2 were followed except that the reaction at 180° C. proceeded for 3 hours. The gel permeation peak average MW of the yellowish product polysuccinimide was 11,300. It was free of catalyst and considered to be linear, unbranched.

Example 4
Preparation of higher MW polysuccinimide by thermal polymerization of aspartic acid in $H_3PO_4$ The procedures and reactions of example 2 were followed except that the reaction at 180° C. proceeded to completion. After 8 hours, the gel permeation peak average MW of the tannish product was 30,667. For comparison, the gel permeation peak average MW of the light brown product after 24 hours of reaction was 33, 280. It was free of catalyst and considered to be linear, unbranched.

Example 5
Preparation of higher MW polysuccinimide by thermal polymerization of aspartic acid in polyphosphoric acid in a vacuum A sample of 250 g of aspartic acid was placed in a pyrex baking dish (10.5'×15'×2') and preheated to 100° C. Next, 37.5 ml of polyphosphoric acid (Sigma Chemical) were added and mixed manually with the aspartic acid on a hotplate at 80° C. to form a paste. The elevated temperature rendered the polyphosphoric acid less viscous, permitting homogeneous mixing with the aspartic powder. The baking dish was then placed in a vacuum oven (VWR) at 190° C. for 4.5 hours at a pressure of 38 mm of Hg. The product rose in the dish to form a very light crusty material that was easily scraped onto a cellulose filter (Whatman #3) and washed to neutrality with distilled water. The product polysuccinimide was light, cream-colored and had a gel permeation peak average MW of 30,000. It was free of catalyst and considered to be linear, unbranched.

Examples 6 to 9
Preparation of high MW polysuccinimides by linking preformed polysuccinimides to each other by nucleophilic crosslinking with a diamine A sample of 10.2 g of the polysuccinimide of example 5 was dissolved in 144 ml of N-methyl pyrrolidone (Sigma Chemical) at 80° C. with smooth magnetic stirring. Next 0.4 ml of 1,4 diamino butane (MW 88.15, density 0.88 g/ml, Aldrich Chemical) was added to the solution of polysuccinimide in NMP, (N-methyl pyrrolidone) now at 40° C. with stirring. The amine groups formed an amide linkage by nucleophilic ring-opening of succinimide residues. The reaction was allowed to proceed for 2 hours. Next, 200 ml of distilled water were added to precipitate the polysuccinimide derivative. The white slurry was allowed to settle, the supernatant containing the NMP was decanted, and this process was repeated 3 more times. Then, the aqueous slurry was transferred to a dialysis tube (Spectrapor, MW cutoff of 1000) and dialyzed against 4 liters of distilled water, with 2 changes of water at 2 hour intervals. The material was then lyophilized, yielding a product polysuccinimide with diamino crosslinks in a ratio of 26.2:1, succinimide residues:diamino butane crosslinks.

These reactions and procedures were repeated, but with varying amounts of diamino butane, which was added as 0.3 ml, 0.2 ml, and 0.1 ml in separate experiments. The results are shown in the following table. The molecular weights of such derivatives approach infinity in the sense that with a volume of crosslinker of 0.5 ml or higher in the above experiment (U.S. patent application Ser. No. 08/596,439 by Sikes), the ring-opened forms of the materials become insoluble gelling agents in water.

TABLE 1

Molecular weights by gel permeation of the ring-opened forms of some crosslinked polysuccinimides.

| Amount of | Ratio of |
| --- | --- |

| Sample | polysuccinimide, volume of diamino butane | succinimide residues to diamine crosslinks | Molecular Weight |
|---|---|---|---|
| Example 6 | 10.2 g, 0.4 ml | 26.2:1 | approaches infinity[1] |
| Example 7 | 10.2 g, 0.3 ml | 34.9:1 | 208,000 |
| Example 8 | 10.2 g, 0.2 ml | 52.4:1 | 60,000 |
| Example 9 | 10.2 g, 0.1 ml | 104.8:1 | 48,000 |

[1] Sample not completely soluble, partially particulate.

Example 10
Preparation of mixed amide/imide copolymer of aspartate and succinimide by thermal polymerization of a mixed salt of aspartic acid and sodium aspartate A sample of 10 g of aspartic acid was placed in a 600 ml beaker to which 100 ml of distilled water were added. The resulting slurry was magnetically stirred and the pH recorded by electrode, standardized to pH 4 with a standard buffer (Fisher Scientific). The slurry was adjusted from a starting pH of 2.90 to pH 4.0 by addition of 10 N NaOH. At pH 4, aspartic acid is partially ionized to aspartate ($pKa_1 = 2.1$, $pKa_2 = 3.9$; Weast et al. 1987). Next, the water was removed by drying at 140° C. for 8 hours to produce hard, white powdery chips of an aspartic acid/monosodium aspartate salt. This was then polymerized for 8 hours at 220° C. The sample rose during heating to fill the beaker with a slightly pink, dry, crusty product. It was hygroscopic on cooling, so it was quickly weighed and placed in a sealed sample bottle. Infrared spectra revealed both an imide peak at approximately 1715 $cm^{-1}$ as well as amide peaks in the region of 1600 $cm^{-1}$, along with carboxylic signals at approximately 1400 $cm^{-1}$. This showed that the product was a copolymer of succinimide and aspartate.

Example 11
Preparation of an imide-free polyaspartate by thermal polymerization of monosodium aspartate A sample of 10 g of monosodium aspartate monohydrate (Sigma Chemical) was placed in a 600 ml beaker, then polymerized at 220° C. for 8 hours. The sample was off-white and rose to fill the beaker by 1 hour, and had become a dry, crusty, hygroscopic, light tan material by 8 hours. No imide peak was seen in the infrared spectra of the product, which was polyaspartate that had formed without formation of polysuccinimide.

Example 12
The effect of the polysuccinimide of example 1,3, and 4 on some properties of a Portland cement mortar The effect of several polysuccinimides on mortar were measured relative to control mortar that contained no additives.

TABLE 2

Effect of polysuccinimides on workability, setting, and compressive strength of a Portland cement mortar, relative to untreated control mortars.

| MW range (peak average) | % polysuccinimide by weight cement powder | workability after mixing | setting time[1] | compressive strength after 7 days moist curing |
|---|---|---|---|---|
| 4000 | 0.054% | equal | slower(+0.6h) | higher(+10%) |
| 4000 | 0.1% | equal | slower(+1.5h) | higher(+7%) |
| 4000 | 0.2% | equal | slower(+1.5h) | higher(+10%) |
| 4000 | 0.3% | higher(+44%) | slower(+0.6h) | lower(−15%) |
| 10,000 | 0.054% | equal | slower(+1.2h) | equal |
| 10,000 | 0.2% | higher(+39%) | faster(−1.6h) | equal |
| 10,000 | 0.3% | equal | faster(−1.9h) | lower(−24%) |
| 25,000 | 0.054% | equal | slower(+0.6h) | equal |
| 25,000 | 0.15% | equal | slower(+1.2h) | lower(−21%) |
| 25,000 | 0.3% | higher(+28%) | slower(+0.6h) | lower(−15%) |

[1] Setting time for control mortar = 2.5 hours.

Example 13
The effect of several polyaspartates prepared from polysuccinimides of Examples 1, 3, and 4 on some properties of a Portland cement mortar The effect of several polyaspartates on mortar were measured relative to control contained no additives.

TABLE 3

Effect of polyaspartate on workability, setting, and compressive strength of a Portland cement mortar, relative to untreated control mortars.

| MW range (peak average) | % polyaspartate by weight cement powder | workability after mixing | setting time | compressive strength after 7 days moist curing |
|---|---|---|---|---|
| 4000 | 0.1% | equal | slower (+1.5 h) | higher (+7%) |
| 4000 | 0.2% | higher (+50%) | faster (−1.8 h) | higher (+3%) |
| 10,000 | 0.2% | higher (+72%) | faster (−1.7 h) | lower (−5%) |
| 25,000 | 0.2% | higher (+53%) | faster (−0.9 h) | lower (−6%) |

Example 14
The effect of the polyaspartate of example 11 on workability and compressive strength of Portland cement and mortar Test cylinders of Portland cement and mortar were prepared as described in the methods. The following table contains a summary of the results of adding a polyaspartate that was prepared by thermal polymerization of monosodium aspartate to Portland cement and mortar.

TABLE 4

Effects of thermally polymerized monosodium aspartate on workability and compressive strength of test cylinders of Portland cement and mortar.

| % polyaspartate by weight of cement power | workability during mixing | curing time | compressive strength, lbs./in$^2$ (means ± standard deviations) | |
|---|---|---|---|---|
| | | | cement (n = 3) | mortar (n = 3) |
| Controls, 0% | + | 2 weeks | 1750 ± 234 | 1733 ± 287 |
| | | 4 weeks | 2216 ± 733 | 1866 ± 216 |
| 0.1% | − | 2 weeks | 2366 ± 529 | 2300 ± 260 |
| | | 4 weeks | 3216 ± 818 | 2316 ± 292 |
| 0.2% | ++ | 2 weeks | 2916 ± 299 | 2650 ± 234 |
| | | 4 weeks | 3066 ± 259 | 2350 ± 321 |
| 0.5% | ++ | 2 weeks | 2566 ± 377 | 1633 ± 206 |
| | | 4 weeks | 2700 ± 562 | 2183 ± 643 |
| 1.0% | +++ | 2 weeks | 2100 ± 210 | 2216 ± 194 |
| | | 4 weeks | 3250 ± 350 | 3050 ± 150 |

+ control workability
− faster setting than controls, more difficult to mix
++ easier to mix than controls, flowed more easily into the molds
+++ easiest to mix, almost pourable into the molds

Example 15
Initial flow and flow retention of Portland type 1 mortar with polysuccinimides of examples 3 and 5 as additives A medium MW and higher MW polysuccinimide was tested for effects on initial flow and flow retention when formulated in Portland type 1 mortar.

TABLE 5

Flow values of Portland type 1 mortar that contained polysuccinimide.

| MW (peak average) | % polysuccinimide by weight cement | % flow at time in minutes | | | | | |
|---|---|---|---|---|---|---|---|
| | | initial | 15 | 30 | 45 | 60 | 90 minutes |
| control | none | 84 | 84 | 82 | 80 | 80 | 76 % flow |
| 30,000 | 0.2% | 80 | 88 | 100 | 104 | 84 | 76 |
| | 0.6% | 80 | 92 | 96 | 84 | 84 | 88 |
| control | none | 84 | 86 | 84 | 76 | 76 | 72 % flow |
| 10,000 | 0.2% | 128 | 88 | 72 | 52 | 42 | 40 |
| | 0.6% | 120 | 108 | 104 | 96 | 88 | 76 |

Methods
Test Cylinders of Cement and Mortar: Table 4

Workability of test cylinders of Portland type 1 cement and mortar was assessed by hand-mixing of samples. Additives were either slurried (if insoluble) or dissolved in the mixing water at the appropriate concentrations by weight of the cement powder. Test cylinders were cast in 3×5 cm cylindrical, plastic molds. Test cylinders of cement were mixed in batches of 200 g cement plus 60 ml of water. Test cylinders of mortar were mixed in batches of 66.7 g cement, 183.3 g sand, plus 32 ml of water. After addition of water to the materials in a beaker, the mixture was stirred by hand with a steel spoon for 3 minutes. The cylinders were filled by hand in batches of 3 cylinders per mixture. The cylinders were agitated for 1 minute to settle the mixtures by use of a vortexer (VWR model 3) that was fitted with an adapter to hold up to 4 cylinders at a time. The cylinders were then placed in an incubator at 20° C., 100% humidity for curing.

Prior to crushing, the cylinders were removed from the plastic molds by carefully scoring one side of the mold with an handheld, rotary saw (Dremel) and pulling off the mold by hand. The cylinders were then capped on the top and the bottom with an thin layer of plaster of Paris (Custom Building Products), made horizontal by use of a level. This provided smooth, horizontal surfaces for more reproducible results of crushing.

The cylinders were crushed by use of an hydraulic press (Carver, Inc.), equipped with a guage that indicated the maximum force applied during crushing, as an indication of the compressive strength of the cylinders. Crushing was done by hand, with one stroke of the press per second.
Measurements of Properties, Including Flow Enhancement and Flow Retention, of Portland (Type 1) Mortar: Tables 2, 3 and 5

Cement, sand, the additive, and water were combined according to ASTM C109 in a mixing bowl and mixed for 3 minutes. The initial flow and air content were measured and the material was returned to the mixing bowl and remixed for 1 minute just prior to each of the measurements at intervals of 15, 30, 45, 60, and 90 minutes. Flow values were determined on a flow table meeting the requirements of ASTM C230, set time was determined according to ASTM C191 and C403, air content was determined according to ASTM C185, compressive strength of table 5 was determined according to ASTM C109 (American Society for Testing and Materials, 1997).
Infrared Spectroscopy Infrared spectra of polymers were measured by use of an FTIR spectrophotometer (Perkin Elmer, model 1600). Samples were mixed in KBr and 13 mm, disc pellets were made at 9000 lbs. for 3 minutes by use of a die (Spectratech) and press (Carver, Inc.).
Molecular Weight Molecular weights of polymers were determined by gel permeation and are peak average molecular weights. Standards were polyaspartates made in-house by solid-phase methods ($Asp_5$ through $Asp_{60}$) and commercial polyaspartates (up to 32,000 MW; low-angle, laser light scattering, Sigma Chemical) and polyglutamates (up to 80,000 MW; low-angle, laser light scattering, Sigma Chemical). A liquid chromatograph (Varian, model 5500) with a 7.5 mm×30 cm column (G 4000 PW, Phenomenex). The mobile phase was 0.01M Tris, 0.1M NaCl, pH 8.00, flow of 1 ml/min, UV detection at 235 nm.
Amino Acid Analysis Confirmation of the composition of polysuccinimides, polyaspartates, and polysuccinimides that contained diaminobutane crosslinks was determined by the PICOTAG protocol (Waters). A sample of 10 μl of a 1 μg/ml stock solution of the polymer was hydrolyzed in vacuo at 150° C. for 1 hour in the presence of HCl vapor to yield amine containing monomers. These were derivatized with phenylisothiocyanate and measured by reverse-phase liquid chromatography (Spectraphysics model 8800), 3.9 mm×15 cm column (Waters Division, Millipore, Inc.), acetonitrile gradient, UV detection at 254 mm, detection limit of 10 pmoles per residue.

Phosphate Analysis

Polymers that were synthesized in the presence of phosphoric catalysts/solvents were cleansed by washing and dialysis. The removal of the catalyst/solvent was confirmed by use of the spectrophotometric assay for the phosphomolybdate complex which is formed in the presence of soluble inorganic phosphate (Eisenreich et al., 1975). The polymers themselves also tested negatively for phosphorus, following acid hydrolysis to release bound phosphorus, if any, as inorganic phosphoric acid.

References Cited

U.S. PATENT DOCUMENTS

| | | |
|---|---|---|
| 3,052,655 | 9/1962 | Sidney W. Fox and Kaoru Harada. Thermal polymerization of amino acid mixtures containing aspartic acid or a thermal precursor of aspartic acid. |
| 3,846,380 | 11/1974 | Yasuo Fujimoto and Masayuki Teranishi. Polyamino acid derivatives and compositions containing same. |
| 4,363,797 | 12/1982 | Bernard Jacquet, Christos Papantoniou, Gérard Land, and Serge Forestier. Polyaspartic acid derivatives, their preparation and their use in cosmetic composition. |
| 4,839,461 | 6/1989 | Gunther Boehmke. Polyaspartic acid from maleic acid and ammonia. |
| 5,051,401 | 9/1991 | C. Steven Sikes. Inhibition of mineral deposition by phosphorylated and related polyanionic peptides. |
| 5,152,902 | 10/1992 | Larry P. Koskan, Kim C. Low, Abdul R. Y. Meah, and Anne M. Atencio. Polyaspartic acid as a calcium carbonate and a calcium phosphate inhibitor. |
| 5,219,952 | 6/1993 | Larry P. Koskan and Abdul R. Y. Meah. Production of high molecular weight polysuccinimide and high molecular weight polyaspartic acid from maleic anhydride and ammonia. |
| 5,290,869 | 3/1994 | Mitsuo Kinoshita, Yoshimasa Miura, and Tsuneo Yamamoto. Cement dispersion agents. |
| 5,329,020 | 7/1994 | Dennis J. Kalota and David A. Martin. Preparation of polysuccinimide. |
| 5,362,324 | 1/1994 | Tiziano Cerulli, Paolo Clemente, Mario Collepardi, Giorgio Ferrari, and Pasquale Zaffaroni. Zero slump-loss superplasticizer. |
| 5,371,180 | 12/1994 | Torsten Groth, Winfried Joentgen, Gunter Boehmke, Gerd Schmitz, and Hans-Joachim Traenckner. Process for the preparation of polysuccinimide and polyaspartic acid. |
| 5,393,868 | 2/1995 | Michael B. Freeman, Yi H. Paik, Ethan S. Simon, and Graham Swift. Production of polysuccinimide by thermal polymerization of maleamic acid. |
| 5,432,212 | 7/1995 | Susumu Honda, Tadashi Hara, and Hideo Koyata. Dispersant composition for cement having excellent property in inhibition of slump-loss. |
| 5,466,289 | 11/1995 | Toshio Yonezawa, Kenrou Mitsui, Makato Nakazima, Mitsuo Kinoshita, Toshihide Shimono, and Tsuneo Yamamoto. Ultra high-strength hydraulic cement compositions. |
| 5,493,004 | 2/1996 | Torsten Groth, Winfried Joentgen, Dorde Jovcic, Paul Wagner, and Hans-Joachim Traenckner. Process for the preparation of polysuccinimide. |
| 5,494,516 | 2/1996 | F. Josef, Tom Melbye, Odd M. Tjugum, and Salvatore Valenti. Workable cementitious compositions. |
| 5,536,813 | 7/1996 | Maurice Charpenel and Jean-Luc Lepage. Detersive polyanhydroaspartic acids and biodegradable hydrolysates thereof. |
| 5,548,036 | 8/1996 | Matthias Kroner, Heinrich Hartmann, Gunnar Schornick, Richard Baur, Birgit Potthoff-Karl, Volker Schwendemann, and Alexander Kud. Preparation of polymers of aspartic acid and their use. |
| 5,609,681 | 3/1997 | F. Josef, Tom Melbye, Odd M. Tjugum, and Salvatore Valenti. Workable cementitious compositions. |
| pending | | Sikes, C. S. Absorbent gelling materials of cross-linked polyaspartate. U.S. patent application 08/596,439. |
| pending | | Sikes, C. S. Imide-free and mixed amide/imide synthesis of polyaspartate. U.S. patent application 08/842,016. |

FOREIGN PATENT DOCUMENTS

| | | |
|---|---|---|
| JP 08277329 | 10/1996 | Masayuki Tomida. Manufacture of poly(aspartic acid salts). |
| JP 08169741 | | Harada, Y., H. Hiroaki, and A. Nagatomo. Slow releasing cement admixture for flowability. |

OTHER PUBLICATIONS

Eisenreich, S. J., R. T. Bannerman, and D. E. Armstrong. 1975. A simplified phosphorus analysis technique. Environmental Letters 9, 43–53.

Hoagland, P. D. and S. W. Fox. The hydrolysis of polyimides. 1973. Experientia 29, 962–964.

Low, Kim C., A. P. Wheeler, and Larry P. Koskan. 1996. Commercial poly(aspartic acid) and its uses. In, J. Edward Glass (ed.), Hydrophilic Polymers: Performance with Environmental Acceptance. Advances in Chemistry Series 248, American Chemical Society, Washington, D.C., p. 99–111.

Mosig, J. 1992. Diplomarbeit. Clemson University, Clemson S.C., and RWTH Aschen, Germany.

Mosig, J., C. H. Gooding, and A. P. Wheeler. 1997. Kinetic and thermal characterization of the hydrolysis of polysuccinimide. Industrial and chemical engineering research 36, 2163.

Schiff, H. 1987. Ueber polyaspartsauren. Chemische Berichte 30, 2449–2459.

Weast, R. C., M. J. Astle, and W. H. Beyer. 1987. CRC Handbook of Chemistry and Physics. CRC Press, Boca Raton, Fla, p. C-699.

Wolk, S. K., G. Swift, Y. H. Paik, K. M. Yocom, R. L. Smith, and E. S. Simon. 1994. One- and Two-dimensional nuclear magnetic resonance characterization of poly (aspartic acid) prepared by thermal polymerization of L-aspartic acid. Macromolecules 27, 7613–7620.

What is claimed is:

1. A method of improving the workability of a cementitious mixture comprising formulating said cementitious mixture with 0.025–5%, by weight of the dry cement powder of said cementitious mixture, of an enhancing agent, wherein said enhancing agent is selected from the group consisting of polysuccinimide, polyaspartate, a copolymer of succinimide and aspartate, polysuccinimide cross-inked with a diamine, polyaspartate formed by alkaline hydrolysis of polysuccinimide cross-linked with a diamine, and mixtures thereof.

2. The method of claim 1, wherein said enhancement agent is present in an amount of 0.05–2% by weight of the dry cement powder of said cementitious mixture.

3. The method of claim 2, wherein said enhancement agent is added in an amount of 0.1–1% by weight of the dry cement powder of said cementitious mixture.

4. The method of claim 1, wherein said enhancement agent is added to a dry cementitious mixture which, upon addition of moisture thereto, forms a cementitious material on hardening.

5. The method of claim 1, wherein said enhancement agent is added to water subsequently combined with a dry cementitious mixture to form said cementitious material on hardening.

6. The method of claim 1, wherein said cementitious mixture, when hardened, exhibits enhanced strength, and said enhancement agent comprises polyaspartate or a copolymer of succinimide and aspartate.

7. A dry cementitious mixture, which, when combined with water, sets over time and hardens to form a cement, mortar, concrete, or other cementitious material wherein said cementitious mixture comprises an enhancement agent, in the amount of 0.025–5% by weight of the cement powder of said cementitious mixture, selected from the group consisting of polysuccinimide, polyaspartate, copolymers of succinimide and aspartate, polysuccinimide cross-linked with a diamine, polyaspartate formed from polysuccinimide cross-linked with a diamine and mixtures thereof.

8. The material of claim 7, wherein said enhancement agent is present in an amount of 0.05–2% by weight of the cement powder of said cementitious mixture.

9. The cementitious mixture of claim 8, wherein said enhancement agent is present in an amount of 0.1–1% by weight of the cement powder of said cementitious mixture.

10. A cementitious material, prepared from a dry cementitious mixture and water, and subsequently hardened, wherein said cementitious material comprises an enhancement agent selected from the group consisting of polysuccinimide, polyaspartate, copolymers of succinimide and aspartate, polysuccinimide cross-linked by diamine, polyaspartate formed from polysuccinimide cross-linked by diamine and mixtures thereof in an amount of 0.025–5%, by weight, as calculated by the weight of the dry cement powder.

11. An article, comprised of cementitious material, wherein the cementitious material is prepared from a dry cementitious mixture and water, and subsequently hardened, wherein said cementitious material comprises an enhancement agent selected from the group consisting of polysuccinimide, polyaspartate, copolymers of succinimide and aspartate, polysuccinimide cross-linked by diamine, polyaspartate formed from polysuccinimide cross-inked by diamine and mixtures thereof in an amount of 0.025–5% by weight, as calculated by the weight of the dry powder.

* * * * *